Patented Feb. 7, 1933

1,896,276

UNITED STATES PATENT OFFICE

GEORGE BARSKY, OF NEW YORK, N. Y., AND HENRY P. WOHNSIEDLER, OF ELIZABETH, NEW JERSEY, ASSIGNORS TO AMERICAN CYANAMID COMPANY, OF NEW YORK, N. Y., A CORPORATION OF MAINE

UREA-ACETALDEHYDE-FORMALDEHYDE RESIN AND PROCESS OF MAKING SAME

No Drawing.   Application filed August 12, 1929. Serial No. 385,474.

The present invention relates to acetaldehyde-urea-formaldehyde resins, processes of preparing same and products containing such resins.

The preparation of many resins of the urea-formaldehyde type has been described and many uses for these resins have been suggested. However, these resinous materials are objectionable from the standpoint of cost and do not have satisfactory stability when initial condensation products are stored for any substantial periods of time.

It is one of the objects of the present invention to prepare urea resins much more cheaply than has been done heretofore. This is obvious from the relative cheapness of acetaldehyde as compared with formaldehyde, and the lesser quantity of urea used per pound of finished product than in the urea-formaldehyde resins. It is a further object to prepare these resins in such a manner as to give stable initial condensation products. It is a still further object of the invention to prepare resins which are more heat resistant than urea-formaldehyde resins.

These and other objects are attained by preparing condensation products of urea with acetaldehyde and formaldehyde.

Urea, acetaldehyde and formaldehyde may be combined in various ways. The manner to be preferred is by condensing urea with acetaldehyde to form ethylidene urea and finally effecting reaction between ethylidene urea and formaldehyde.

More specifically, a resin forming part of the present invention may be prepared from the following material:

|  | Parts |
|---|---|
| Urea | 300 |
| Acetaldehyde | 231 |
| Water | 510 |
| N/2 hydrochloric acid | 200 |

The urea is dissolved in the water to produce a cold solution and the liquid acetaldehyde is added slowly, maintaining the temperature of the mixture at 20–30° C. The dilute acid is then added to the solution and the reaction allowed to proceed for several days to one week at 20–30° C. The precipitate which is formed during this interval is filtered and thoroughly triturated and washed with hot water to extract any soluble impurities which it may contain. The resulting product is ethylidene urea and has a nitrogen content corresponding to this compound and generally melts at 240–245° C.

The following mixture is then prepared:

|  | Parts |
|---|---|
| Ethylidene urea | 22 |
| Formalin (38% HCHO) | 30 |
| Water | 15 | and after making acid to methyl red with 0.2 part of N/2 hydrochloric acid, the whole is heated at its boiling point until solution occurs. This solution may be treated in any one of a number of different ways to obtain the final product. The clear solution may be made alkaline to methyl red with sodium hydroxide and then concentrated to yield a clear, resinous product which is water soluble. A water solution of this resin may be used to impregnate paper, fabric, or the like, and can then be transformed into an insoluble resin by treatment with an acid in either gaseous or liquid form. Further, the clear solution prepared as above may be concentrated and finally hardened by heating at 70° C. to form a clear, colorless, water insoluble resin.

Other proportions of materials may be used, as for instance, a mixture of the following:

|  | Parts |
|---|---|
| Ethylidene urea | 22 |
| Formalin (38% HCHO) | 60 | is prepared, made acid and solution completed by boiling as described. Upon evaporating and hardening at 70° C. the syrup forms a clear, colorless tough resin.

The resinous materials prepared as above described are well adapted to be cast or molded either alone or incorporated with various filler materials such as paper pulp, wood fiber and the like, mineral colors, dyes, etc., to form molding powders or compositions. For instance, a mixture made up of the following:

| | Parts |
|---|---|
| Ethylidene urea | 43 |
| Formalin, (38% HCHO) | 40 |
| Water | 25 |
| N/2 hydrochloric acid | 2.0 | is boiled for five minutes under reflux and filtered. 94 parts of the clear, colorless syrup obtained are incorporated with 27 parts of disintegrated paper pulp and the whole dried to yield 75 parts by weight. This product is ground to form a powder suitable for molding at 145–160° C. under pressure. The molded products have a good appearance, being unusually translucent, tough and heat resistant, only being decomposed at very high temperatures. If desired our resins may be blended with urea-formaldehyde and/or thiourea-formaldehyde resins for the production of molding compositions or other purposes.

It is to be understood that the present invention is not limited to the specific matters set forth since the proportions and nature of ingredients, temperatures, times of reaction and order of steps may be varied widely to suit any particular desired conditions.

For instance, if desired, the urea may be condensed with a mixture of acetaldehyde and formaldehyde in the desired proportions to give the resin in one step instead of carrying out two separate condensations. The one-step condensation generally operates more smoothly when it is carried out in the presence of an inert solvent such as certain alcohols or the like. Particularly suitable for use in connection with the one-step condensation is a commercial product containing a mixture of formaldehyde, acetaldehyde and methyl alcohol. Ordinarily this material must be subjected to fractional distillation to separate the components thereof whereas, by using it for preparation of one of the resins forming a part of the present invention, the formaldehyde and acetaldehyde are combined with the urea and the methyl alcohol remaining may be distilled off and recovered in any suitable manner.

Many other changes and modifications may be made in the invention without departing from the spirit and scope thereof except as defined in the appended claims.

We claim:

1. A process of preparing a resinous material comprising condensing urea with acetaldehyde and formaldehyde in an acid medium, neutralizing the resulting solution and evaporating to dryness to yield a clear, resinous product soluble in water.

2. A process of preparing a resinous material comprising condensing urea with acetaldehyde and formaldehyde in the presence of an inert solvent.

3. A water soluble resinous condensation product of urea, acetaldehyde and formaldehyde.

In testimony whereof, we have hereunto subscribed our names this 8th day of August 1929.

GEORGE BARSKY.
HENRY P. WOHNSIEDLER.